Aug. 4, 1959   A. J. HANLON   2,898,447
BOUNCE FLASH ADAPTER
Filed Aug. 15, 1957   2 Sheets-Sheet 2

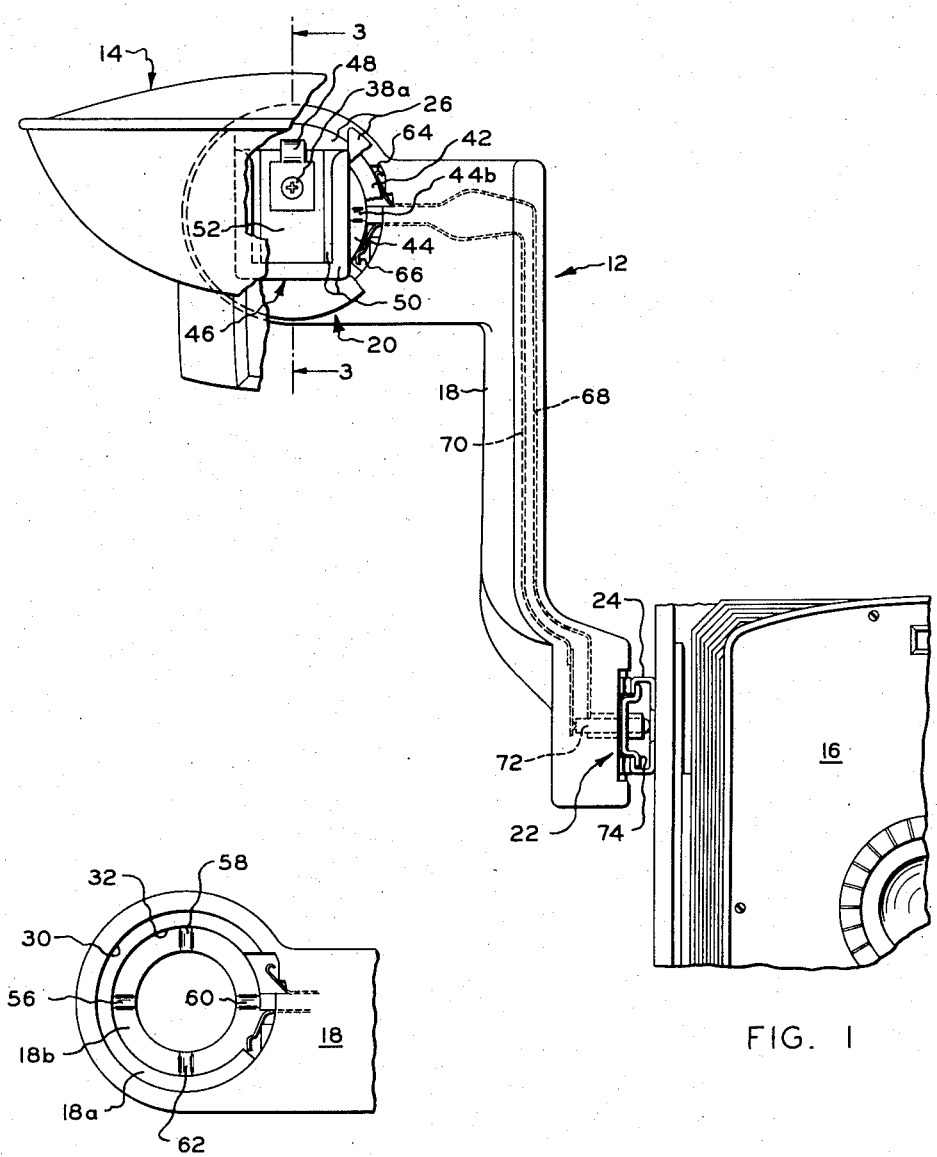

INVENTOR.
Albert J. Hanlon
BY
Brown and Mikulka
ATTORNEYS

United States Patent Office 2,898,447
Patented Aug. 4, 1959

2,898,447

BOUNCE FLASH ADAPTER

Albert J. Hanlon, Somerville, Mass., assignor to Polaroid Corporation, Cambridge, Mass., a corporation of Delaware Application August 15, 1957, Serial No. 678,456

11 Claims. (Cl. 240—1.3)

The present invention relates to photography and more particularly to an accessory or adapter for holding a flash gun in a disired position with respect to a camera during flash photography.

It has been found, in flash photography, that when a flash bulb or gun is aimed directly at the subject of a photographic exposure, the resulting picture may have certain undesirable qualities. The photograph may lack depth, shadows may appear too pronounced, objects near to the camera may be fully exposed or overexposed while those farther away may be underexposed, etc. To avoid these undesired results when using a flash gun in indoor photography, it has increasingly become the practice to reflect or "bounce" the light toward the subject from an adjacent surface and, more particularly, from a ceiling. Through this technique of so-called "bounce flash," a softer diffused lighting of the subject is provided, the photographic print is free of the aforementioned defects and is thus of a generally more pleasing quality. To hold and aim the flash gun in one hand while holding and operating the camera and flash gun with the other hand is so awkward a procedure as to generally preclude the taking of a satisfactory picture. It has therefore recently become the practice to employ some form of intermediate device for holding the flash gun fixed with respect to the camera and aimed in the desired direction.

The present invention is concerned with a bounce flash device or adapter of the aforesaid general type which incorporates novel means for easily and practically instantaneously changing the aiming position of the flash gun to conform with changes in the held position of the camera for vertical or horizontal picture taking. A distinct advantage of the adapter resides in the fact that, once mounted on the camera, it permits rapid and accurate movement of the flash gun to positive given positions identified with vertical and horizontal positions of the camera, so that the aim of the flash gun has a given relation to a reference dimension of the camera such as the short and long dimensions of a long rectangular picture area, without the necessity of making trial settings or dismounting and remounting the flash gun with respect to the adapter. It also offers the advantage of providing a correct aiming position for the flash gun when the camera is held upside down, which may occasionally be preferred by the photographer.

In accordance with above considerations, an object of the present invention is to provide an adapter for mounting a flash gun on a camera in such a manner that the aim of the flash gun is set with extreme rapidity and precision at given positive positions for correct bounce flash operation, when the camera is held in either vertical or horizontal position.

Other objects are to provide an adapter of the character described which is simple to operate and in which the aforesaid positive positions are provided by a rotatable head of the adapter having detent means which establish the correct positive aiming positions; to provide an adapter having a third positive aiming position for use when the camera is held upside down; to provide an adapter having continuously adjustable flash gun aiming positions located between the aforesaid positive detent positions; to provide an adapter having a receptacle or clip for receiving the flash gun mounting foot which is similar to the accessory clip of a camera; to provide an adapter having novel electrical connections and detent means; and to provide an adapter which is of lightweight, strong and trouble-free construction.

Other objects of the invention will in part be obvious and will in part appear hereinafter.

The invention accordingly comprises an article of manufacture possessing the features, properties, and relation of elements which will be exemplified in the article hereinafter described and the scope of the application of which will be indicated in the claims.

For a fuller understanding of the nature and objects of the invention, reference should be had to the following detailed description taken in connection with the accompanying drawings wherein:

Figure 1 is a diagrammatic front view of the bounce flash adapter with parts broken away, showing the mounting of a flash gun on the adapter and the mounting of the adapter on a camera;

Fig. 2 is a diagrammatic front view of a portion of the adapter of Figure 1 with parts removed.

Figure 3:
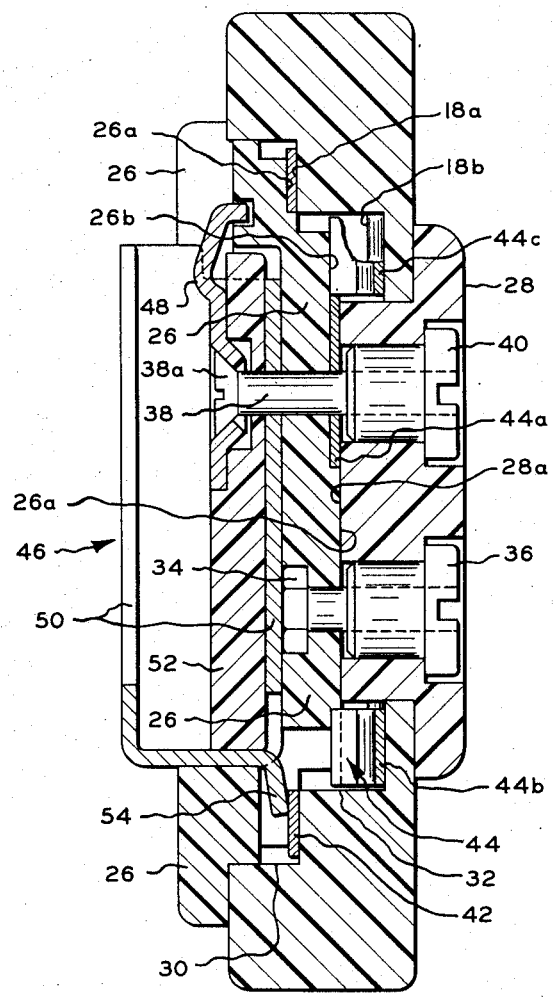
Fig. 3 is a sectional view of the rotatable head of the adapter of Figure 1 taken along the line 3—3 of Fig. 1.

As shown in Fig. 1, the adapter 12 holds a flash gun 14 aimed toward the ceiling for correct bounce flash photography, the adapter being mounted on a camera 16 held in vertical position. The adapter comprises an L-shaped arm 18 having a rotatable head 20 and a mounting foot 22, the latter being adapted to be inserted in an accessory clip 24 of the camera. Arm 18 and the supporting parts of rotatable head 20 may appropriately be made of any substantially rigid lightweight material as, for example, a plastic material having electrical insulating properties such as the plastic material "Tenite," manufactured by Eastman Chemical Products, Inc., Kingsport, Tennessee.

The rotatable head 20 comprises circular plate elements 26 and 28 formed of the aforesaid plastic material, mounted for rotation in relatively inwardly stepped apertures 30 and 32, respectively, and held together at surfaces 26a and 28a by hex-head screw 34 which engages slotted nut 36 and self-tapping screw 38 which engages slotted nut 40, a rather loose fit of the plates thus being provided in said apertures. By loosening nuts 36 and 40, plates 26 and 28 may be separated and removed to expose the interior of the rotatable head shown in Fig. 2. A circular, flat, washer-like element 42 is releasably fastened against independent rotation to plate element 26 as, for example, by projections (not shown) which fit into indentions (not shown) of the plate and is mounted in aperture 30 between surface 26a of plate 26 and surface 18a of the arm 18. Element 42 serves principally as an electrical contact maker relative to other elements to be described below. A second circular flat, multi-purpose element 44, in the form of a resilient wave-washer, is mounted in aperture 32 so as to bear, respectively, against surface 26b of plate 26 and surface 18b of arm 18. Element 44, by applying bias against surface 26b serves to compensate for the aforesaid loose fit of the plates in the apertures by taking up the slight play along the axis of rotation of said plates and provides a moderate damping or braking effect during turning of the rotatable head. Element 44 also principally serves as an electrical contact maker with respect to other elements to be described below. Additionally, element 44 comprises part of a detent means, to be described below, for locating the rotatable head at given established angular positions.

Elements 42 and 44 are preferably formed of a flexible metal such as phosphor bronze. When plates 26 and 28 are removed, as above described, contact makers 42 and 44 are exposed to view and may readily be removed for cleaning or for any other purpose.

A mounting receptacle or clip 46 for receiving the mounting foot of the flash gun and establishing electrical contact therewith, is fixedly attached to plate 26 so as to rotate with the rotatable head 20, said clip preferably resembling the camera accessory clip 24. Clip 46 includes slotted metallic edge members or channels 50, a central contact 38a and detent means for holding the flash gun mounting foot firmly in place, said contact and detent means being formed by the countersunk head of screw 38 forming said contact 38a and by the contoured plate element 48. A plastic insert 52 in which plate element 48 is inset provides a surface for facilitating the slidable insertion of the flash gun mounting foot in slots 50.

Spring element 44 has a flat, coplanar portion 44a extending radially inwardly in which screw 38 is threadedly engaged, thus fastening contact maker element 44 to plates 26 and 28 for rotation therewith and establishing an electrical connection between contact 38a and element 44. A protruding tongue 54, integral with slots 50 of the mounting clip, is in contact with contact maker element 42, thus establishing an electrical connection between slots 50 and said element 42.

Detent means of element 44 comprise a pair of diametrically opposed engaging means such as protuberances or lugs 44b and 44c which are adapted by the inherent springiness and wave-washer form of element 44 to slip into each diametrically opposed pair of the indentions 56, 58, 60 and 62 formed in surface 18b when the rotatable head is turned to a position providing alignment of pairs of said protuberances and indentions. Assuming the adapter to be mounted in the camera accessory clip, when the pair of lugs 44a and 44b are located in indentions 56 and 60, respectively, a flash gun mounted in clip 46 is aimed upwardly toward the ceiling with the camera held vertically, but upside down. When the lugs are located in indentions 58 and 62 the flash gun is aimed upwardly toward the ceiling with the camera held horizontally. When the lugs are located in indentions 60 and 56, the flash gun is aimed upwardly toward the ceiling with the camera held vertically and rightside up. It will thus be apparent that the angular positions of the rotatable head identified with the detents are actually established with respect to given surfaces of the camera or to the long and short edges of the image area of the camera. It will further be apparent that the plates 26 and 28 of the rotatable head are substantially parallel with the image plane of the camera, although some predetermined relation other than parallelism may intentionally be provided. It will also be understood that a relative location of the detent lugs and recesses different from that shown may be employed to accomplish a similar result provided that correct aim of the flash gun is thus established.

Rotatable head 20 can be rotated, without limit, in either direction as, for example, by manually applying a turning force to the flash gun. This is permitted by the novel form of electrical connections provided to the flash gun mounting clip involving the use of contact makers of the character described. The outer edges of the contact maker elements 42 and 44 constitute efficient electrical contacting surfaces for a pair of brush elements 64 and 66. Elements 64 and 66 are provided at the extremities of a pair of spring connectors 68 and 70 mounted in separate slotted portions of arm 18 and extending between the rotatable head 20 and the mounting foot 22. In a preferred embodiment, each brush and connector is actually a single unitary flat spring of phosphor bronze, formed substantially as shown. Connector 70 thus establishes an electrical connection between the central contact 38a of clip 46 and the central, spring biased plunger 72 of mounting foot 22. Connector 68 similarly establishes an electrical connection between the slots 50 of clip 46 and the retaining flanges 74 of mounting foot 22.

Since certain changes may be made in the above article without departing from the scope of the invention herein involved, it is intended that all matter contained in the above description or shown in the accompanying drawings shall be interpreted as illustrative and not in a limiting sense.

What is claimed is:

1. A bounce flash adapter device incorporating rapidly adjustable means for mounting a flash gun on a camera so that the flash gun is positively aimed upwardly at a correct angle for providing reflection of light rays from an overhead surface to the subject of a photographic exposure when the camera is held either for vertical or horizontal picture taking, said adapter device comprising a unitary, rigid, angularly-shaped support arm, a mounting foot fixedly attached to one end of said support arm for releasably mounting said arm firmly on the accessory clip of a camera, said foot comprising a pair of electrical contacts for establishing connection with the electrical contacts of said accessory clip, a rotatable head mounted on the opposite end of said arm in annular concentric bearing means thereof and including a pair of annular, metallic, electrical contact maker means fastened to said head and rotatable together therewith, a receptacle clip fastened to an external surface of said rotatable head for rotation therewith, said clip comprising a pair of electrical contacts and serving to releasably mount and to establish electrical contact with the mounting element of a flash gun, electrical contact and connector means in contact with and providing electrical connections between said receptacle clip and said pair of annular contact maker means and between the latter and said mounting foot, and mutually-engageable detent means in part carried by said rotatable head and in part formed on a surface of said arm adjacent said rotatable head for rapidly establishing and releasably holding both said rotatable head and a flash gun mounted thereon at a plurality of rotational positions.

2. An adapter device as defined in claim 1 wherein said rotational positions of the rotatable head as provided by said detent means are established relative to the long and short edges of an image area of the camera.

3. An adapter device as defined in claim 2 wherein the support arm is L-shaped and wherein said arm and rotatable head are formed of an electrically insulating plastic material for insulating said electrical contact and connector means.

4. An adapter device as defined in claim 2 wherein the rotatable head comprises a pair of plastic plate elements fastened together and mounted for rotation in a pair of relatively stepped recesses formed at one end of said support arm, the receptacle clip being mounted on one of said plate elements and the contact maker means being mounted between said plate elements and surfaces of said arm forming said recesses.

5. An adapter device as defined in claim 2 wherein said electrical contact maker means of the rotatable head comprises a pair of flat, annular, metallic rings which are fastened to and rotate with the rotatable head and wherein said electrical contact and connector means comprises a pair of brush elements mounted on the support arm and biased into contact with the edges of said metallic rings.

6. An adapter device as defined in claim 5 wherein one of said electrical contact maker metallic elements and a movable part of said detent means are incorporated in a single element.

7. A bounce flash adapter device for mounting a flash gun on a camera incorporating means for rapidly and positively aiming the flash gun upwardly to direct light rays therefrom to an overhead surface so that they are reflected to the photographic subject when the camera is held either for vertical or horizontal picture taking, said device comprising a unitary, rigid, L-shaped support arm composed of an electrically insulating material, a stepped annular recess formed adjacent one end of said arm, a mounting foot fixedly attached to the other end of said arm for releasably mounting the arm on the accessory clip of a camera, said foot comprising a pair of electrical contacts for establishing connection with the electrical contacts of said accessory clip, a rotatable head comprising a stepped annular projecting portion mounted for rotation in said annular recesses, said head being in the form of two separable plate elements releasably held together, prinicpally formed of an electrically insulating material and including a pair of annular metallic electrical contact maker means, at least one of which has an irregular surface and is composed of a springy metal, fastened to said plate elements so as to rotate therewith, a receptacle clip mounted centrally on an external surface of said rotatable head for rotation therewith, said clip comprising a pair of electrical contacts and serving to releasably mount and to establish electrical contact with the mounting element of a flash gun, electrical contact and connector means comprising resilient contacting elements and a pair of flat elongated metallic strips mounted in recesses of said supporting arm providing elecrical connections between said receptacle clip for the flash gun and said pair of annular contact maker means and between the latter and said mounting foot, and detent means, a movable element of which is comprised by said contact maker means having said irregular surface and a fixed element of which is comprised by engaging means of said arm adjacent said contact maker means, said detent means serving to provide positive positioning of said rotatable head and, accordingly, positive airm of a flash gun mounted thereon at either of two positions angularly disposed substantially at 90° relative to one another to provide the aforesaid direction of light rays when the camera is held in either of said positions.

8. A bounce flash adapter device as defined in claim 7 wherein the annular contact makers are exposed by dismounting the separable plate elements and may be removed from the rotatable head.

9. A bounce flash adapter device as defined in claim 7 wherein one of the contact maker means is in the form of a modified wave-washer and incorporates the movable component of the detent means.

10. A bounce flash adapted device as defined in claim 7 wherein the rotatable head is infinitely rotatable in either direction while continuously maintaining contact between peripheral edges of said contact maker means and a pair of resilient contacts of said electrical contact and connector means.

11. The combination, with a flash gun having a mounting element and a camera providing a long rectangular image area and having an accessory receptacle mounted on an external surface, of a bounce flash adapter device for mounting said flash gun relative to said camera so that said flash gun is aimed upwardly at a given correct angle for providing reflection of light rays from an overhead surface onto a photographic subject irrespective of whether the camera is held, when taking a picture, with the long or short side of said image area uppermost, said adapter device comprising an integral, rigid angularly-shaped support arm, a mounting foot attached to and extending from one end of said support arm for releasably mounting said arm on said camera accessory receptacle, said foot including a pair of electrical contacts adapted to establish connection with the electrical contacts of said accessory receptacle, a two-sectional rotatable head mounted adjacent the opposite end of said arm in annular concentric bearing grooves formed in opposite sides of said arm, and including a pair of annular metallic, electrical contact maker means fastened to said head and rotatable together therewith, one of said contact maker means being composed of a springy metal and formed to bear against one of said bearing grooves to provide a snug fit of said head therewithin and a slight braking of said head during rotation thereof, a receptacle clip including a pair of electrical contacts fastened to an external surface of said rotatable head for rotation therewith, said clip serving to releasably mount and to establish electrical contact with said flash gun mounting element, electrical contact and connector means in contact with and providing electrical connections between said receptacle clip and said pair of annular contact maker means and between the latter and said mounting foot, and detent means in part carried by said rotatable head and in part by a surface of said arm adjacent to said head for rapidly establishing and releasably holding both said head and a flash gun mounted thereon at a plurality of rotational positions.

References Cited in the file of this patent

UNITED STATES PATENTS

| | | |
|---|---|---|
| 2,596,376 | De Goeij | May 13, 1952 |
| 2,602,879 | Whelan | July 8, 1952 |

FOREIGN PATENTS

| | | |
|---|---|---|
| 946,246 | Germany | July 26, 1956 |